United States Patent [19]

Dran et al.

[11] 4,436,575
[45] Mar. 13, 1984

[54] DEVICE FOR MANUFACTURING A HEATING GLASS PLATE

[75] Inventors: Maurice Dran, Paris; Bernard Jamet, Sully sur Loire, both of France

[73] Assignee: Saint Gobain Vitrage, Courbevoie, France

[21] Appl. No.: 419,504

[22] Filed: Sep. 17, 1982

Related U.S. Application Data

[62] Division of Ser. No. 223,107, Jan. 7, 1981, Pat. No. 4,395,622.

[30] Foreign Application Priority Data

Jan. 8, 1980 [FR] France ............................... 80 00278

[51] Int. Cl.³ .............................................. H06B 3/00
[52] U.S. Cl. ...................................... 156/433; 29/611;
156/361; 156/391; 219/522
[58] Field of Search ............... 156/166, 391, 433, 272, 156/275, 361; 118/207, 221; 343/712; 428/208; 219/503, 522, 528, 543; 140/92.1, 92.2; 29/620, 621, 611

[56] References Cited

U.S. PATENT DOCUMENTS

| 3,392,759 | 7/1969 | Davy et al. | 140/92.1 |
| 3,673,044 | 6/1972 | Miller et al. | 156/433 |
| 3,778,898 | 12/1973 | Gruss et al. | 29/611 |
| 3,813,519 | 5/1974 | Jochim et al. | 219/522 |
| 3,874,330 | 4/1975 | Zoccolinia | 118/221 X |
| 3,910,809 | 10/1975 | Fern et al. | 156/433 |
| 3,964,959 | 6/1976 | Adams | 156/433 |

FOREIGN PATENT DOCUMENTS 846195 9/1939 France .
1464585 1/1967 France .

Primary Examiner—Volodymyr Y. Mayewsky
Attorney, Agent, or Firm—Pennie & Edmonds

[57] ABSTRACT

A heating glass plate (15, 20, 27, 34) has a heating network (17, 24, 31, 36) made up of wires embedded in a thermoplastic layer following curved directrices. A device for making a heating glass plate having a plate (39) for supporting thereon a plastic sheet. A bridge (44) is slidably supported on the plate and has thereon a sliding carriage (45) carrying wire-laying members (46). Means are provided for imparting reciprocal motion to the carriage. A rod (51) connects the carriage to a vertical spindle (52).

4 Claims, 7 Drawing Figures

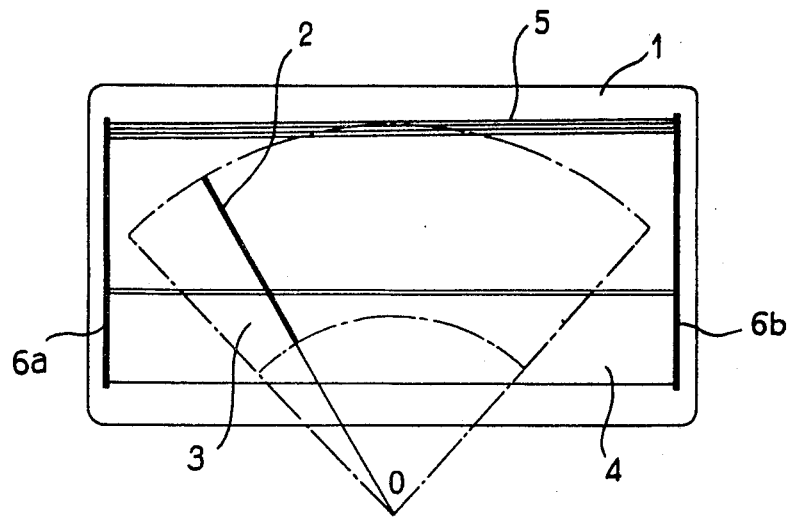
FIG_1 PRIOR ART
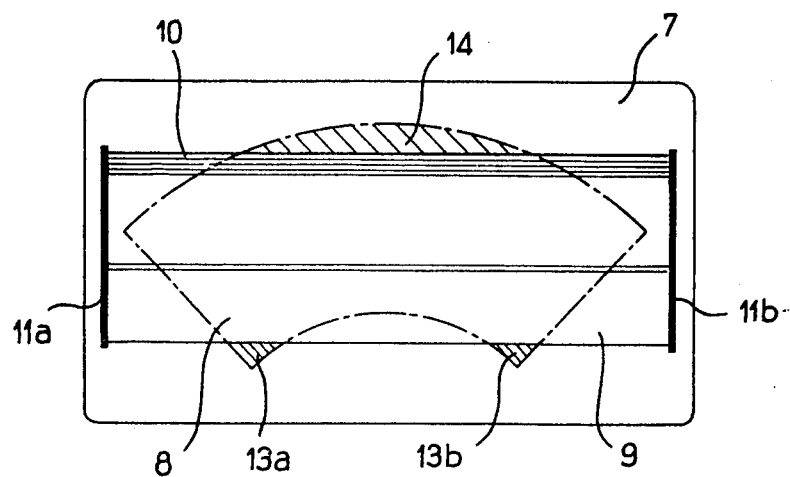
FIG_2 PRIOR ART

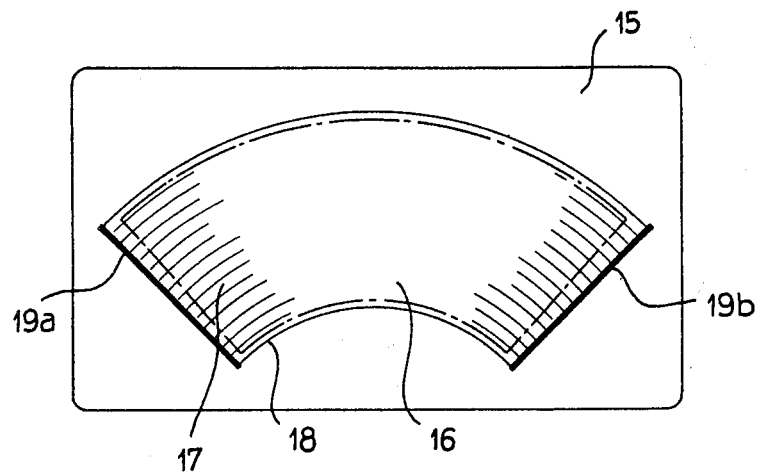
FIG_3
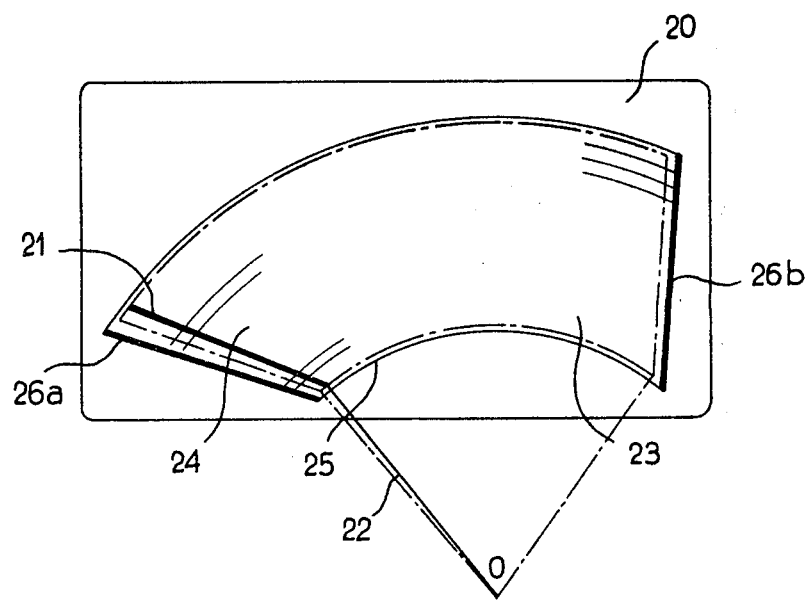
FIG_4

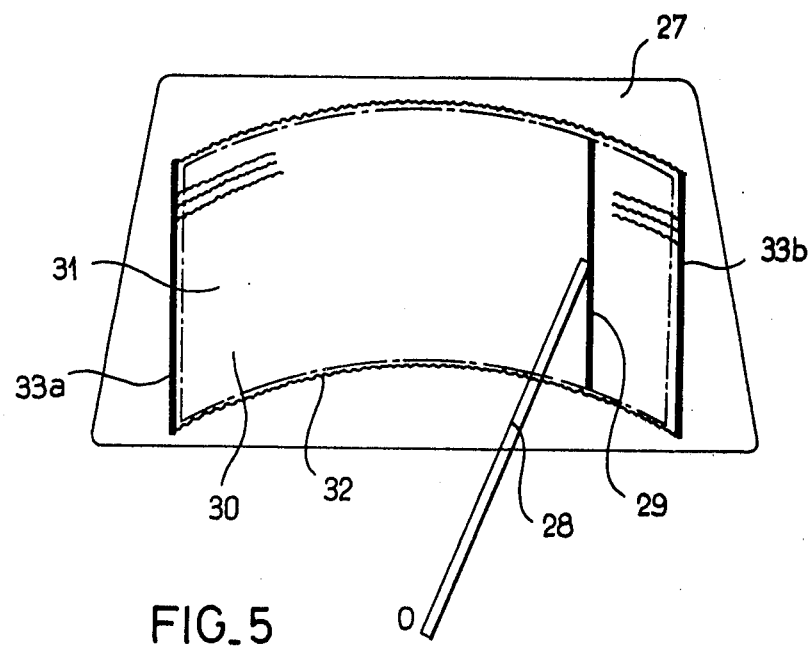
FIG_5
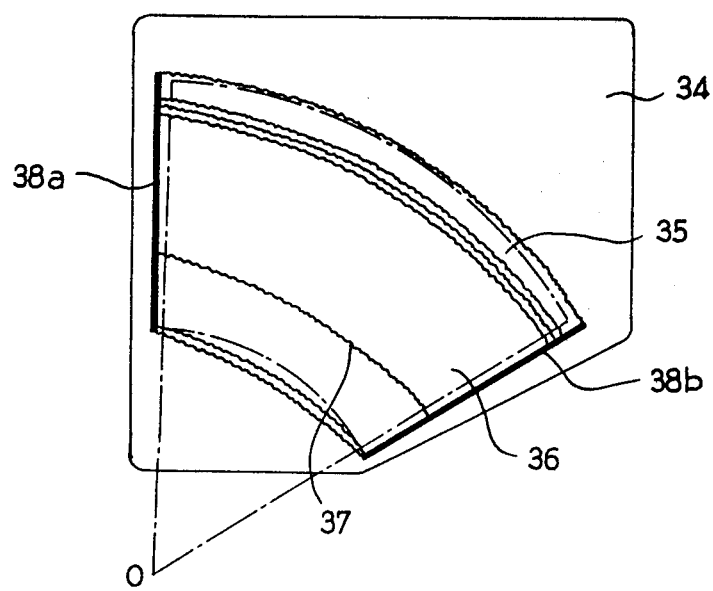
FIG_6

DEVICE FOR MANUFACTURING A HEATING GLASS PLATE

This is a division, of application Ser. No. 223,107 filed Jan. 7, 1981, now U.S. Pat. No. 4,395,622.

FIELD OF THE INVENTION

This invention relates to a heating glass plate having electrical resistance wires therein adapted for use as a windshield in vehicles and a device for such glass plate.

BACKGROUND ART

The use of heating glass panes of the type described for equipping vehicles for air, sea or land transport is known. Such glass is notably used for windshields of airplanes, boats, automobiles, and trains, for example. The glass comprises a network made up of fine metallic wires arranged in parallel between two collector strips or buses connected to a source of electrical current located outside of the glass. These conductors, stretched in a straight line or bent in segments with rectilinear directrices, are most frequently undulated or curled along the rectilinear directrices with a view of better distribution for the dissipation of heat, of a reduction in the magnitude of the phenomena of optical diffraction caused by the presence of the network, and of an increase in the length of wire for a given distance between collector strips.

The electrical voltage, the diameter of the wire, the length of the wire and the spacing of the wires are determined with a view to producing a unit power rating, expressed in watts per square decimeter, of approximately 2 w/dm$^2$ to 70 w/dm$^2$ depending upon the use of the glass. Thus, for example, when the glass is used as a heating rear window or cab window or heating windshield in automobiles or trains, the unit rating generally ranges from 3 to 10 w/dm$^2$. In marine transport, such heating panes generally have a unit rating of from 10 to 20 w/dm$^2$, approximately, while in aviation such unit rating may vary from 15 to 70 w/dm$^2$, approximately.

Whenever the vehicle is not limited in terms of electrical power, the entire windshield may be heated to prevent frost and "steam"; thus, in particular, the heating guarantees the proper operation of the windshield wipers.

Generally, however, vehicles, and in particular small aircraft, helicopters and small boats, are limited in terms of electrical power, in which case only a portion of the glass pane is heated.

In accordance with the known art, the resistance wires are arranged along rectilinear directrices that are generally parallel and only the collector strips may possibly be curved. Furthermore the strips, in view of their width, are usually situated at the edges of the glass pane in order not to hamper vision.

Windshield wipers used with such heating glass usually have circular translation or rotation movements. As a result it is impossible for the heating wires to completely cover the contour of the surface that the wipers sweep unless an area that extends substantially beyond the swept area is heated. This, however, requires a considerable amount of electrical power. The result is that only a small zone that fits in places within the area swept by the windshield wiper gets heated. The area of visibility is consequently greatly reduced in case of rain. Further there exists the danger that the wihdshield wiper, provided that it does not remain stuck when starting up, may at least undergo rapid wear and tear and have its operation greatly disturbed in case of frost on the portion of the area swept by it that is not heated.

It is therefore an object of the invention to overcome the aforementioned drawbacks and to create a heating network having an optimal heating area made up of fine electrical resistance wires embedded in a thermoplastic layer where the area coincides with the area to be swept by wipers.

DESCRIPTION OF THE INVENTION

Broadly a glass plate constructed according to the invention has a heating network made up of fine electrical resistance wires which extend along curved directrices that are in the shape of arcs of circles. The wires preferably are made of blackened copper, ferronickel or tungsten having a diameter which may range from approximately 15 to 30 microns, placed along each directrix or curled and undulated on either side thereof. The spacing between the wire directrices will range from approximately 0.5 to 3 mm, depending upon the use of the glass, with the different parameters being selected as in the known art, as a function of the specific power rating to be achieved.

In accordance with one embodiment of the invention, the electric-wire heating network, having directrices that are arcs of circles, covers an area that is equal or very close to the area of the glass swept by a windshield wiper. This area constitutes a circular strip, as for example a sector of an annulus delimited by two radii, or else a surface with at least two curved sides having a form that may vary widely, depending upon the type of windshield wiper and its operation. Thus, in accordance with the invention, it is possible to heat only useful area of the glass, hence obtaining a savings in power.

For the sake of ease of implementation the wires are preferably arranged along directrices that are arcs of circles having the same radius, spaced at short intervals. In accordance with one embodiment of the glass pane, all the directrices of the wires which make up the heating network are arcs of circles having the same radius obtained by translation.

In a further embodiment, the directrices of the wires making up the network are arcs of circles having the same center but different radii.

Whenever the heating network is made up of wires placed along directrices in the shape of arcs of circles, it can cover an area having a variable shape. Thus the network can cover an area in the shape of a circular sector having any desired angle at the center and with the wire directrices having a small circle-arc radius. Similarly, the network may have a surface with a highly variable shape whenever it is made up of wires that are curled or undulated about the curved directrices. However, when the wire directrices have a small radius of an arc of a circle and are very close to one another, the amplitude of the undulations must be sufficiently small in order to prevent heating disturbances. The same is true when the angle at the center of the sector covered by the network is wide.

The invention likewise includes a device for the manufacture of a heating network made up of fine wires arranged along directrices in the shape of arcs of circles. The device in accordance with the invention may comprise certain members of known systems commonly used for the manufacture of heating glass having a network made up of fine wires placed along rectilinear directrices. Such a device is described, for example, in French Pat. No. 1 565 953. This device consists of a horizontal plate supporting a thermoplastic sheet on which the electrical network is to be embedded. A rectangular bridge is fixed above the plate on which a carriage bearing wire laying members slides in a reciprocal motion perpendicular to an axis of the bridge. The wire laying members consist of a heating head ending in a wire guide for embedding the wire on the thermoplastic sheet and a presser foot held elastically against the plate in order to press against the surface of the sheet. The presser foot being connected to the heating head maintains the head at a constant distance from the surface. At the end of each reciprocal movement of the carriage, the wire laying members pivot 180° while at the same time a step-by-step plate advance mechanism shifts the plate with respect to the carriage by the distance separating two consecutive wires and in the direction of the center line of the network which is the same as the center line of the plate.

When a network of wavy wires is to be formed, the laying members are further endowed with a small-amplitude oscillatory motion perpendicular to the reciprocal movement of the carriage by means of a cam moved by a rack placed along the bridge.

The device in accordance with the invention further comprises means whereby it is possible to lay the wires along curved directrices, notably arcs of a circle, and a step-by-step advance mechanism shifting the carriage and the plate with respect to one another. This is achieved in one embodiment of the invention by having the bridge curved along an arc of a circle in a plane parallel to the surface of the plate. With this device it is possible to manufacture a glass pane with a heating network made up of wires the directrices of which are all in the shape of the same arc of a circle, which may be an arc of a circle described by the windshield wiper with which the window glass is equipped. However, this embodiment is not entirely satisfactory from a number of standpoints, due to its cost, its lack of flexibility of use, and the excessive deformation of the undulations of the network on the edges.

In accordance with a preferred embodiment of the invention, the device comprises a rectilinear bridge as in the known art, but instead of being stationary, it is mounted freely at each of its extremities on slides which are parallel to one another and oriented parallel to the center line of the plate. The carriage bearing the wire laying members and sliding on the bridge is fixed by means of a connecting rod to a vertical axis located in the median plane of the plate supporting the thermoplastic sheet.

The carriage during its reciprocal movement along the bridge is guided in its travel by the bridge and consequently describes a trajectory in the shape of an arc of a circle having a radius equal to the length of the connecting rod uniting it to the fixed point. With this system it is possible to produce a network of wires the directrices of which are arcs of a circle.

By shifting the respective positions of the axis of rotation of the connecting rod and the plate, it is possible to produce a network made up of wires following directrices having a constant radius but shifted, each time the travel of the carriage is reversed, by the desired spacing between wires.

If the length of the connecting rod is modified, the length of the arc of the circle described by the carriage is also modified and in this way it is possible to produce different networks made up of wires following directrices having a constant radius but differing from one network to another.

By gradually changing the length of the connecting rod while maintaining the plate stationary, networks can be produced made up of wires following concentric directrices having radii that progressively change, if, each time that the travel of the carriage is reversed, the length of the rod is decreased by a distance corresponding to the spacing between two wires.

In accordance with a further embodiment, the device may include a step-by-step plate advance mechanism and also a mechanism capable of adjusting the length of the connecting rod as the carriage moves to and fro.

BRIEF DESCRIPTION OF THE DRAWINGS

FIG. 1 illustrates a standard heating glass plate equipped with a heating network made up of wires having rectilinear directrices;

FIG. 2 illustrates another standard-type heating glass pane;

FIG. 3 illustrates a heating glass pane constructed according to the invention;

FIG. 4 illustrates a further embodiment of a heating glass pane constructed according to the invention;

FIG. 5 illustrates a still further heating glass pane according to the invention;

FIG. 6 illustrates a further embodiment of a heating glass pane constructed according to the invention; and, FIG. 7 illustrates a device for producing heating glass plates in accordance with the invention.

BEST MODES FOR CARRYING OUT THE INVENTION

Figure 7:
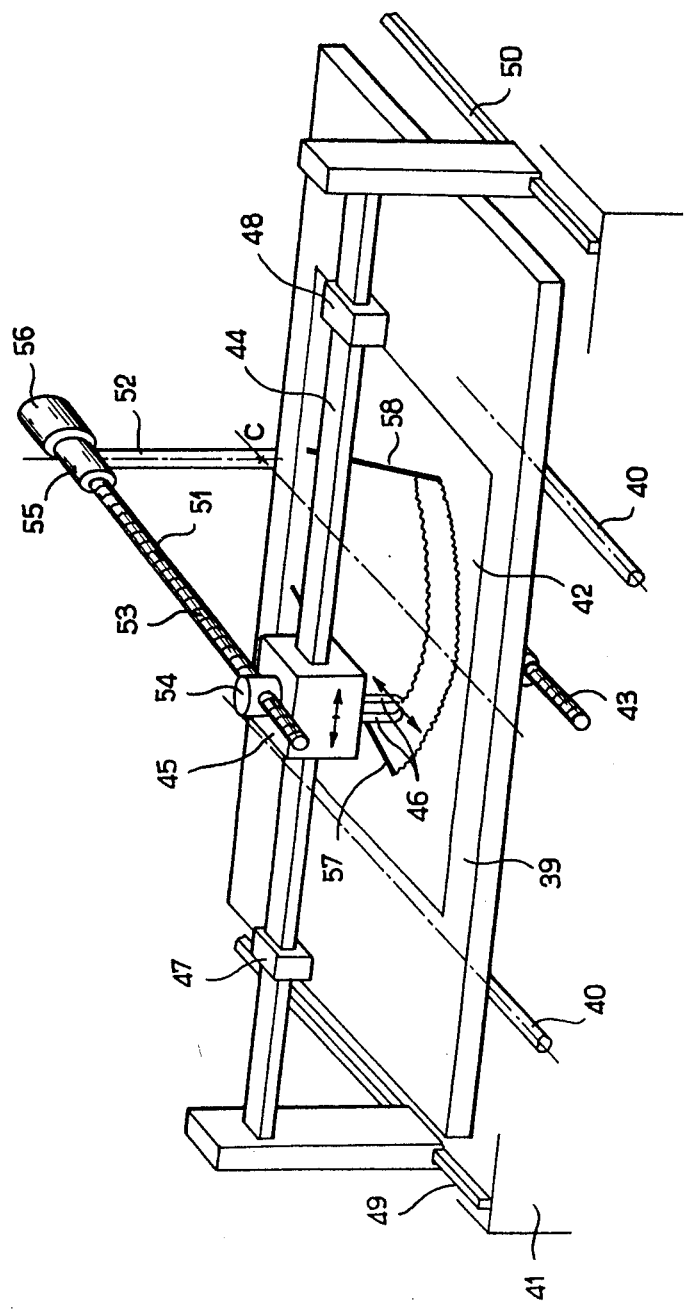

FIG. 1 shows a laminated glass plate 1 equipped with a windshield wiper 2 which, revolving about an axis 0, sweeps an area 3 shown in a dot-and-dash line. What is involved is a laminated glass plate comprising an intermediary sheet on which there is embedded a rectangular heating network 4 of fine electrical resistance wires placed along rectilinear directrices 5 between two collector strips 6a and 6b. Owing to the scale, the undulations of the wires are not illustrated. In this glass plate, the heating network covers a zone circumscribed about the area 3. It covers a sizeable area part of which will be unnecessarily heated in the event of rain since it is outside the area swept by the wiper thus it will absorb a large amount of electrical power.

FIG. 2 shows a laminated plate of glass 7 the windshield wiper of which sweeps an area 8 in a rotating motion. This glass plate likewise comprises a heating network 9 of fine wires placed along rectilinear directrices 10 between two collector strips 11a and 11b. The heating network covers a zone limited in extent, which is easier to heat but intercepts only a portion 12 of the area 8. The zones unnecessarily heated are reduced, but the hatched portions 13a, 13b and 14 of the area swept by the windshield wiper are not heated. The area of visibility 12 is thus accordingly reduced. Furthermore, in the event of frost, portions 13a, 13b and 14 will remain frosted in spite of the operation of the heating system. It follows that the windshield wiper will operate in an incorrect manner.

FIG. 3 illustrates a glass plate 15 which is equipped with a windshield wiper that sweeps an area 16 in a rotational motion and which, according to the invention, comprises a sheet on which there is embedded a heating network 17 of electrical resistance wires arranged along directrices 18 in the form of arcs of concentric circles with variable radii between two collector strips 19a and 19b. The wires shown along the directrices may to advantage be curled or undulated about them for the reasons already mentioned above. The heating network is entirely and almost exactly coextensive with the area swept by the windshield wiper. The operation of the heating network is optimal due to the fact that it heats the entire useful area and it alone, hence at the cost of a minimum amount of electrical power.

FIG. 4 illustrates a glass plate 20 provided with a windshield wiper the blade 21 of which is slightly inclined with respect to the arm 22. This windshield wiper sweeps an area 23 different from a sector of an annulus. In accordance with the invention this glass comprises a sheet in which there is embedded a heating network 24 of fine electrical resistance wires placed along directrices 25 which are concentric arcs of circles with variable radii between two collector strips 26a and 26b. Here again the heating network is entirely and exactly coextensive with the area 23 swept by the windshield wiper.

FIG. 5 illustrates a glass plate 27 equipped with a windshield wiper 28 the blade 29 of which moves in a circular translation motion covering an area 30. The wires of the heating network 31 in accordance with the invention are here laid along directrices 32 having a constant radius between the collector strips 33a and 33b, in successive strands spaced a constant distance apart.

FIG. 6 illustrates a laminated glass plate 34 equipped with a windshield wiper sweeping an area 35 and comprises an intermediary sheet in which there is embedded a heating network 36 of undulated fine electrical resistance wires arranged along directrices 37 which are arcs of circles having the same radius, between two collector strips 38a and 38b. As shown, the heating network is entirely coextensive with the area swept by the windshield wiper. The maximum and minimum radii described by the windshield wiper are respectively about 30 and 60 centimeters about a point 0. The sweeping angle thereof is that formed by the two collector strips, or approximately 70 degrees, but the radius of the directrix arcs is approximately 70 centimeters and the angle of aperture of their laying arcs is consequently reduced to 60 degrees in the widest portion thereof. The wire directrices are equidistant by 1 mm. The amplitude of the undulations is such that the length of wire per 1 meter of directrix is 1.20 m, that is to say the undulation factor is 1.2. The wire is a tungsten wire having a diameter of 15 $\mu$m with a resistance of approximately 400$\Omega$ per linear meter.

Referring to FIG. 7 there is shown a device whereby it is possible to manufacture heating glass and more precisely the heating networks thereof. The device comprises a plate 39 mounted on guides or slides 40 which are integral with a frame 41. The plate in turn supports a thermoplastic sheet 42 generally made of polyvinyl butyral. The plate is given an adjustable step-by-step advance movement by means of a guide screw 43. A rectilinear horizontal bridge 44 extends perpendicular to and above the guide. This bridge supports a sliding carriage 45 which carries members 46 for laying the wire on the thermoplastic sheet.

The wire-laying members are of a standard type and are mounted elastically on a vertical axis. They are provided with a cam system driven by a rack located along the bridge (not illustrated) giving them an oscillatory motion which is perpendicular to the reciprocal movement of the carriage so that the wire is laid substantially in the form of a sinusoid. Each stroke of the carriage is limited by two lateral stops 47 and 48 mounted in a sliding fashion on the bridge and bringing about the turning back of the laying members.

According to the invention the bridge is freely mounted on two guides or slides which are integral with the frame, located on either side of the plate, following its direction of advance. The sliding carriage is further connected by a connecting rod 51 to a fixed vertical spindle 52 placed in the median plane of the plate and integral with the frame 41.

The rod is made up of a threaded shaft 53 mounted in a screw arrangement on the pivot 54 and controlled in terms of rotation within its bearing 55 which is integral with the spindle 52 by means of a stepper motor 56 whereby it is thus possible to modify the working length of the connecting rod by means of an action analogous to that of the guide screw on the plate.

The device operates in the following manner:

A thermoplastic sheet is placed on the plate in such a way that the center line of the proposed network and that of the plate coincide. The two collector strips 57 and 58 are placed at the desired locations on the thermoplastic sheet.

The carriage 45 bearing the laying members is placed over one extremity of a collector strip and then, once these members have been properly placed, it is caused to slide with a reciprocal motion along the bridge 44. At the same time the connecting rod 51 causes the bridge to be displaced on the guides 49 and 50 and the rack imparts a transverse motion to the wire laying members. The carriage during its movement describes a trajectory which is an arc of a circle, with a center corresponding to point 0 and with a radius equal to that of the rod, and delimited by the stops, the position of which will be gradually changed as the successive passages take place. The wire is thus laid along a curve having a sinusoidal shape with a constant transverse pitch. Following each reciprocal movement of the carriage a rotation of the guide screw 43 causes the plate 39 to advance a distance equal to the spacing between the directrices of two neighboring strands.

The wire laying members pivot 180° at the end of each stroke; the movement reverses and the following strand is laid along a directrix having the same radius and separated by the desired spacing following an arc the length of which can be adjusted at will.

Once the network of wires is completed, the extremities of the wires and the two strips initially put in place may be covered with two identical collector strips. The wires are then soldered to the collector strips.

The thermoplastic sheet bearing the heating network may be an intercalary sheet of a laminated glass plate. In this case the assembly thereof with the other elements of the laminate, as, for example, with glass sheets, is effected in a manner in itself well known.

The thermoplastic sheet bearing the heating network may also be a rigid polycarbonate or polymethacrylate sheet, for example, and the laying of the wire network is effected in the same manner. In this case it may itself constitute the heating glass.

In accordance with an operating variant of the device described in relation to FIG. 7, the guide screw 43 remains immobile at the end of the successive strokes, so that the plate, and consequently the center 0 of the arcs of circles, is maintained stationary throughout the entire laying operation. It is the motor 46, on the contrary, which advances a step, thus decreasing the working radius of the rod by a distance corresponding to the spacing of the successive strands. It thus results from this that as the successive movements of the carriage take place, the wire is laid along arcs of circles with decreasing radii.

It is clear that numerous modifications which do not lie outside of the scope of the invention are possible and, for example, one might cause both the position of the center and the radius of the arc of the circle to change at the same time by simultaneously acting both advance mechanisms, or, by suppressing the oscillation of the laying members on the carriage, lay the wires precisely along the curved directrices.

Further, all the programmed movements which have just been described could be executed by an electronically controlled precision plotting table.

The only limitation encountered, resides in the fact that on the edges of the network, the undulations of the wires are slanting with respect to the mean direction of the tracing, by an angle equal to one-half the total aperture of the corresponding arc of a circle. In nearly all the cases met with in actual practice, it has been found that such an inclination is not a hindrance. Moreover, it has been demonstrated that it is possible to reduce this limitation by increasing the radius of curvature of the directrices slightly if needed.

We claim:

1. A device for the manufacture of glass plate having a heating network made up of fine electrical resistance wires embedded in a thermoplastic layer following curved directrices extending between two collector strips, said device comprising a supporting plate adapted to support a thermoplastic sheet, a bridge supporting a sliding carriage, resistance wire-laying members carried by said carriage, means for imparting reciprocal motion to said carriage, guides extending perpendicular to said bridge on which said bridge may slide, a rod connecting said carriage to a vertical spindle located in the median plane of the plate, and an intermittent advance mechanism for intermittently shifting the plate with respect to the carriage.

2. A device according to claim 1, wherein said rod is adjustable in length.

3. A device according to claim 2, wherein said intermittent advance mechanism advances said plate and having in addition a rod adjusting mechanism responsive to the reciprocal motion of said carriage.

4. A device according to claim 1, having in addition wire-laying oscillation means for imparting an oscillatory motion substantially perpendicular to the reciprocal motion of the carriage.

* * * * *